April 23, 1940.　　　　M. PANCHUK　　　　2,198,414
TRANSMISSION HOIST
Filed May 9, 1939　　　2 Sheets-Sheet 1
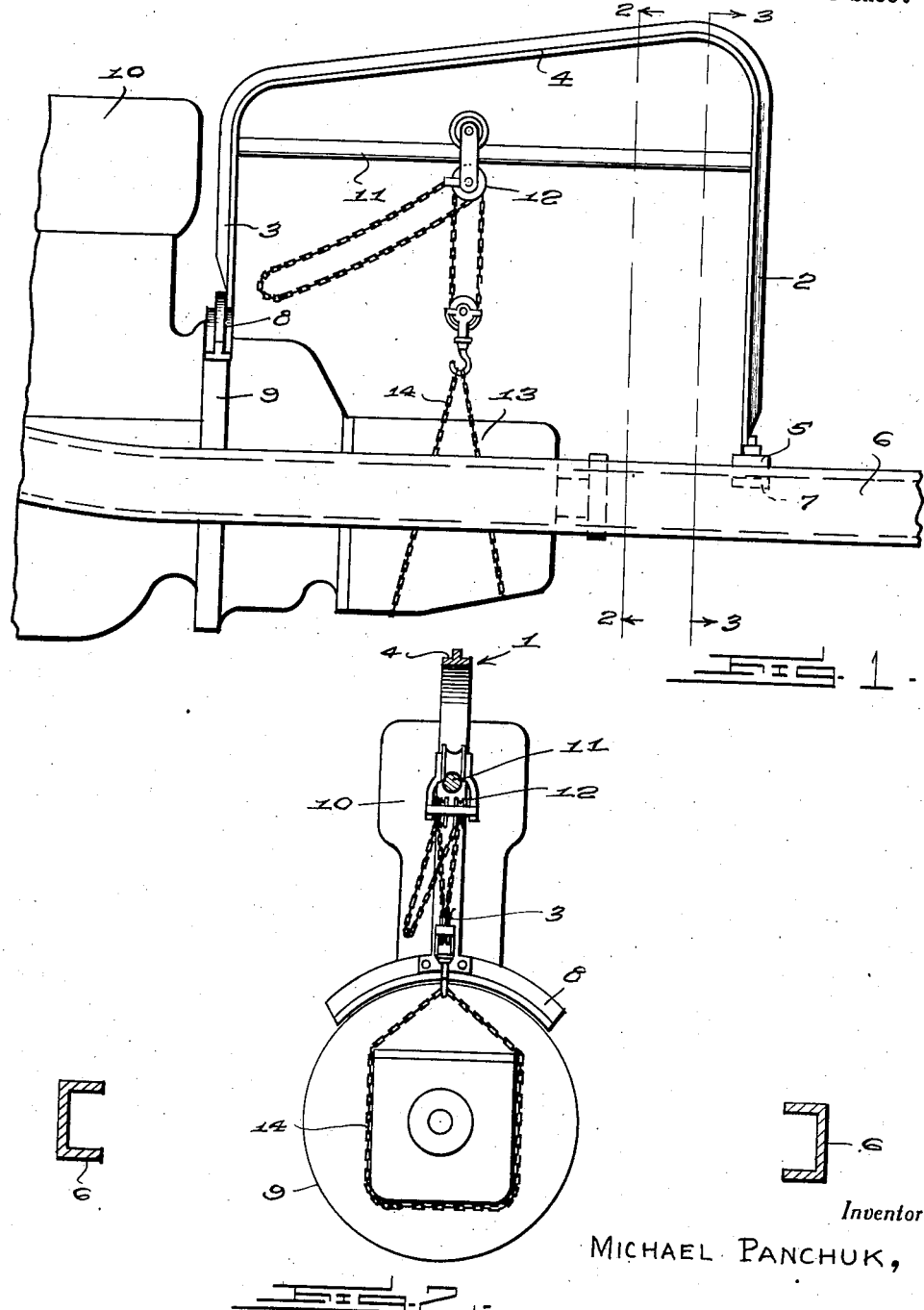
Inventor
MICHAEL PANCHUK,
By Clarence A. O'Brien
and Hyman Berman
Attorneys

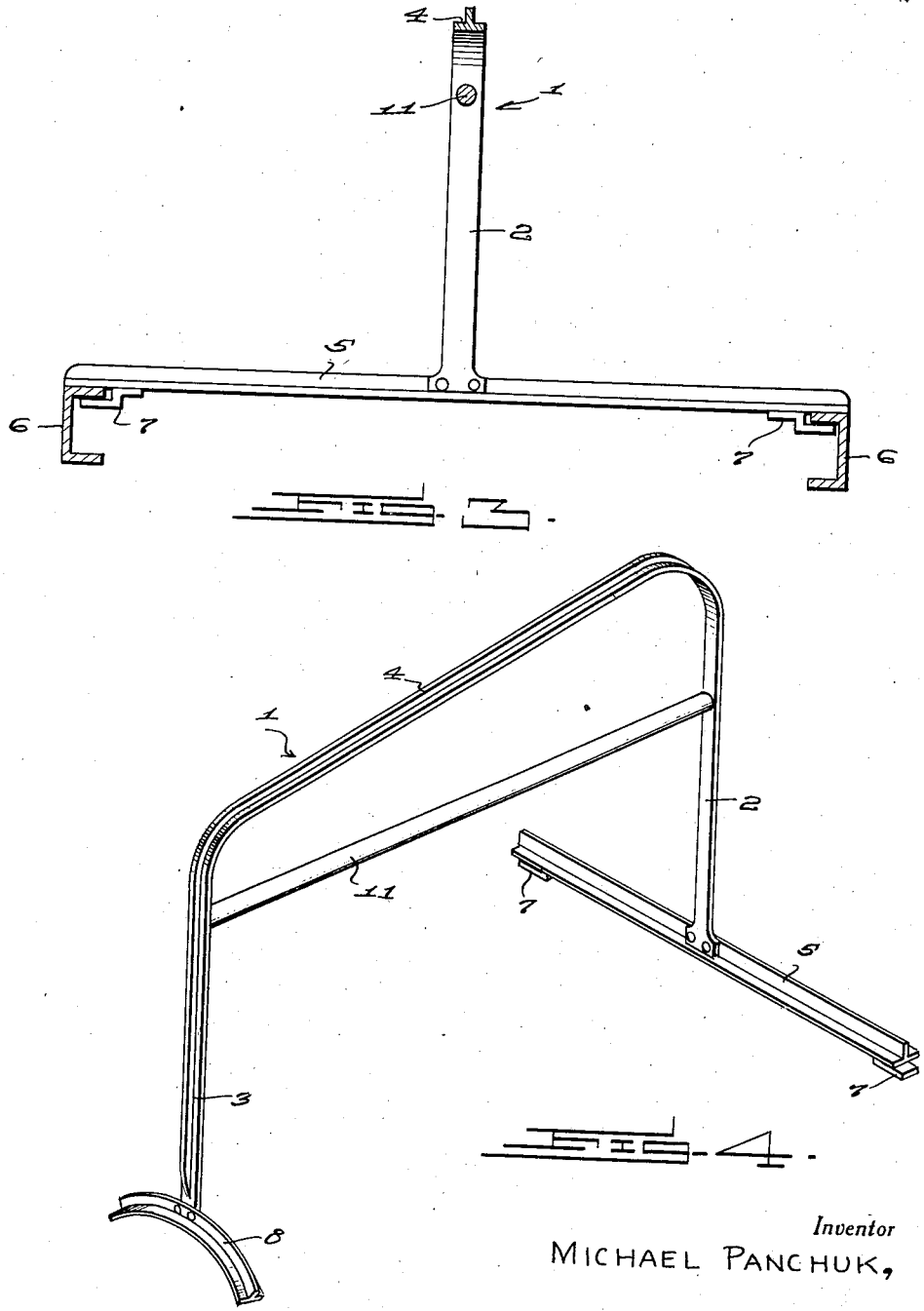

Patented Apr. 23, 1940

2,198,414

UNITED STATES PATENT OFFICE 2,198,414

TRANSMISSION HOIST

Michael Panchuk, Newark, N. J.

Application May 9, 1939, Serial No. 272,685

1 Claim. (Cl. 212—133)

The present invention relates to new and useful improvements in transmission hoists for automobiles and has for its primary object to provide, in a manner as hereinafter set forth, a device of this character which is adapted to be readily mounted in the vehicle after the floor boards have been removed to facilitate removing and replacing the transmission.

Other objects of the invention are to provide a transmission hoist of the character described which will be comparatively simple in construction, strong, durable, highly efficient and reliable in use, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in side elevation of a transmission hoist constructed in accordance with the present invention, showing the device mounted in position ready for use.

Figure 2 is a cross sectional view, taken substantially on the line 2—2 of Fig. 1.

Figure 3 is a cross sectional view, taken substantially on the line 3—3 of Fig. 1 and looking rearwardly, as indicated by the arrows.

Figure 4 is a perspective view of the invention.

Referring now to the drawings in detail, it will be seen that the embodiment of the invention which has been illustrated comprises a frame structure of any suitable metal which is designated generally by the reference numeral 1. The frame 1 includes a rear leg 2, a comparatively short front leg 3 and an inclined intermediate portion 4 connecting said legs. This is shown to advantage in Figs. 1 and 4 of the drawings.

Rigidly secured transversely on the lower end portion of the rear leg 2 of the frame 1 is a supporting bar 5. The end portions of the bar 5 are adapted to rest on the side members 6 of the automobile frame. Clamps 7 retain the bar 5 on the frame members 6 of the vehicle.

Rigidly secured on the lower end portion of the comparatively short leg 3 of the frame structure 1 is an arcuate metallic bar 8. The bar 8 is adapted to rest on the fly wheel housing 9 of the engine 10 of the vehicle, with the shape of which housing said bar 8 substantially conforms.

Extending between the upper portions of the legs 2 and 3 of the frame structure 1 is a metallic rail 11 of circular cross section. Mounted to travel on the rail 11 is a double hoist chain pulley 12. The reference numeral 13 designates the transmission of the automobile to be removed.

It is thought that the operation of the hoist will be apparent from a consideration of the foregoing. To remove a transmission, the floor boards of the automobile are taken out to permit mounting of the frame structure 1 in position. The double hoist chain pulley 12 is rolled to position on the rail 11 and a chain 14 is looped under the transmission and connected to said hoist pulley. Then, by actuating the hoist pulley the transmission may be expeditiously raised out of the frame. The construction and arrangement is such that the device may be mounted in different makes of automobiles. The hoist is also adapted to facilitate replacement of the transmission in the vehicle.

It is believed that the many advantages of a transmission hoist constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

A transmission hoist comprising a substantially U-shaped frame adapted to be mounted in an automobile above the longitudinal center thereof, said frame being formed from a single length of metal and including a rear leg, a comparatively short front leg and a connecting portion extending between the legs, a bar mounted transversely on the lower end of the rear leg and adapted to rest on the frame of the automobile, an arcuate bar mounted on the lower end of the front leg and engageable on the fly wheel housing of the engine of the automobile, a rail extending horizontally between the legs in the upper portion of the frame, and a hoist pulley for lifting the transmission operable on said rail.

MICHAEL PANCHUK.